United States Patent
Ou et al.

(10) Patent No.: US 8,065,445 B1
(45) Date of Patent: Nov. 22, 2011

(54) ON-DEMAND SWITCHING BETWEEN HARDWARE AND SOFTWARE IMPLEMENTATIONS OF A PERIPHERAL DEVICE

(75) Inventors: Jingzhao Ou, San Jose, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 70 days.

(21) Appl. No.: 12/727,169

(22) Filed: Mar. 18, 2010

(51) Int. Cl.
*G06F 13/10* (2006.01)
(52) U.S. Cl. .................. 710/15; 710/6; 710/17; 710/19
(58) Field of Classification Search ........................ None
See application file for complete search history.

(56) References Cited

U.S. PATENT DOCUMENTS

| | | | | |
|---|---|---|---|---|
| 5,708,808 | A * | 1/1998 | Shoichi | 718/108 |
| 6,760,909 | B1 * | 7/2004 | Draves et al. | 718/102 |
| 2003/0041190 | A1 * | 2/2003 | Kolli | 710/38 |

* cited by examiner

*Primary Examiner* — Ilwoo Park
(74) *Attorney, Agent, or Firm* — Kevin T. Cuenot

(57) ABSTRACT

A method of accessing a peripheral device can include determining whether the peripheral device is busy. The method can include selectively providing to a processor, according to whether the peripheral device is busy, either a driver or a program. The driver, when executed by the processor, causes the processor to offload the operation to the peripheral device. The program, when executed by the processor, causes the processor to perform the operation in lieu of the peripheral device performing the operation.

20 Claims, 3 Drawing Sheets

ON-DEMAND SWITCHING BETWEEN HARDWARE AND SOFTWARE IMPLEMENTATIONS OF A PERIPHERAL DEVICE

FIELD OF THE INVENTION

One or more embodiments disclosed within this specification relate to integrated circuit devices (ICs) and systems that include multiple processes. More particularly, one or more embodiments relate to using a hardware peripheral device that is shared among the plurality of processes within the system.

BACKGROUND

Hardware peripheral devices (peripheral devices) are often included within systems to perform selected operations quickly and efficiently. The peripheral device typically is custom hardware that is designed to perform a selected operation efficiently. In this regard, peripheral devices can be referred to as "hardware accelerators." One example of a custom peripheral device, or hardware accelerator, is a circuit or processor specifically designed to perform Fast Fourier Transform (FFT) operations. Typically, the hardware accelerator can perform the FFT operations in less time than a conventional, or general purpose, processor executing software would require to perform the same operations. Continuing with this example, a process within the system can offload an FFT operation to the peripheral device rather than perform the FFT operation itself, thereby increasing the overall system speed.

Peripheral devices typically are single core systems. Thus, when disposed within a multi-process system, the peripheral device can only service one request at a time. When performing an operation requested by a first process within the system, the peripheral device is busy, and thus, not available to service a request from any other process. Accordingly, requests for service directed to the peripheral device from other processes are not acted upon until the peripheral device completes processing of the request from the first process. Only when finished processing the first request from the first process will the peripheral device begin to service a next and different request.

While incorporation of a peripheral device has advantages in terms of reduced processing time, such devices also introduce complexity and potential bottlenecks into a system. Any process that wishes to utilize the peripheral device must include the necessary intelligence, whether via additional programming or circuitry, to determine whether the peripheral device is busy or available. The process further must have the intelligence to react to either condition. Accordingly, any designer of a process in the system that seeks to utilize the peripheral device must have knowledge of the way in which the peripheral device works in order to leverage functionality of the peripheral device. In the case of a software-based process, for example, the software developer must create the necessary program code for interacting with the hardware peripheral device as described. That program code must be configured to contend with cases in which the peripheral device is free and busy.

SUMMARY

One or more embodiments disclosed within this specification relate to integrated circuit devices (ICs) and systems that include multiple processes. More particularly, one or more embodiments relate to using a hardware peripheral device that is shared among the plurality of processes within the system.

One embodiment of the present invention can include a method of accessing a peripheral device. The method can include determining whether the peripheral device is busy. A driver or a program can be selectively provided to a processor according to whether the peripheral device is busy. The driver, when executed by the processor, causes the processor to offload the operation to the peripheral device. The program, when executed by the processor, causes the processor to perform the operation in lieu of the peripheral device performing the operation.

Another embodiment of the present invention can include a system including a peripheral device having a status of busy or free and a memory. The memory can be configured to store a driver that, when executed by a processor, causes the processor to offload a selected operation to the peripheral device, and a program that, when executed by the processor, causes the processor to perform the selected operation. The peripheral device can be configured to selectively provide the driver or the program to a processor when the processor seeks access to the peripheral device according to whether the status of the peripheral device is busy or available.

Another embodiment of the present invention can include a system including a peripheral device and a memory configured to store a driver that, when executed by a processor, causes the processor to offload a selected operation to the peripheral device, and a program that, when executed by the processor, causes the processor to perform the selected operation. The system also can include at least one translation look-aside buffer coupled to the peripheral device. The at least one translation look-aside buffer can be configured to store an entry referencing either the driver or the program. The peripheral device can be configured to update the entry of the at least one translation look-aside buffer to reference the driver or the program in the memory according to whether the peripheral device is busy.

DETAILED DESCRIPTION OF THE DRAWINGS

Figure 1:
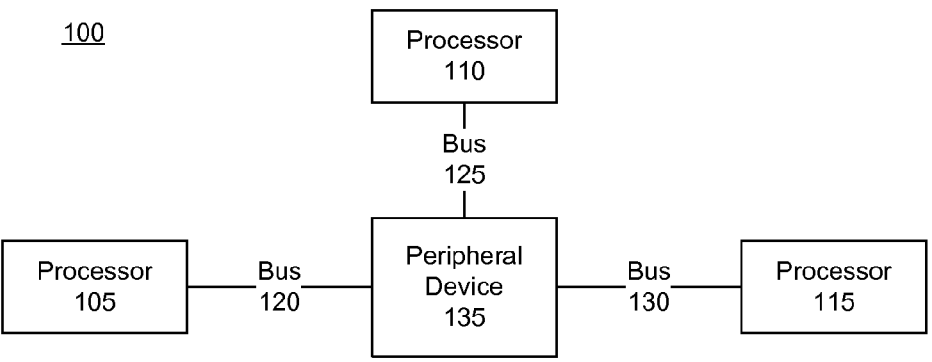
FIG. 1 is a first block diagram illustrating a multi-processor system in accordance with one embodiment of the present invention.

While the specification concludes with claims defining the features of one or more embodiments of the invention that are regarded as novel, it is believed that one or more embodiments of the invention will be better understood from a consideration of the description in conjunction with the drawings. As required, one or more detailed embodiments of the present invention are disclosed herein; however, it is to be understood that the disclosed embodiments are merely exemplary of the inventive arrangements, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of one or more embodiments of the invention.

One or more embodiments disclosed within this specification relate to integrated circuit devices (ICs) and systems that include multiple processes. More particularly, one or more embodiments relate to using a hardware peripheral device that is shared among a plurality of processes within a system. In accordance with the inventive arrangements disclosed herein, an intelligent hardware peripheral device is disclosed. The hardware peripheral device can aid processes in accessing the hardware peripheral device based upon whether the hardware peripheral device is free or busy. The requesting processes need not have any knowledge of how to interact, or interface, with the hardware peripheral device other than to issue a request for service (request).

When the hardware peripheral device is free, e.g., not servicing a request, a process that issues a request to the hardware peripheral device can be given access to the hardware peripheral device to effectively offload an operation to the hardware peripheral device. For example, a software driver can be provided to the requesting process that, when executed via the process that issued the request, facilitates offloading of the operation to the hardware peripheral device. The driver effectively provides the instructions necessary for the process to interface with the hardware peripheral device.

When the hardware peripheral device is busy servicing a prior request, a process that issues a request to the now busy hardware peripheral device can be provided with a program. The program, when executed via the process that issued the request, can enable the process to perform the operation that originally was to be offloaded to the hardware peripheral device. Thus, the requesting process is able to perform the operation without having to wait for the hardware peripheral device to become available.

One or more embodiments disclosed within this specification facilitate concurrent processing of operations despite the fact that the hardware peripheral device may be implemented as a single core type of device capable of servicing only a single request at a time. Although the requesting process performs the operation more slowly than the hardware peripheral device, the net amount of time needed for performing the operation can be reduced since the wait otherwise incurred by the requesting process for the hardware peripheral device to become available is eliminated. In this regard, bottlenecks resulting from multiple processes attempting to access the hardware peripheral device concurrently or in an overlapping manner can be avoided. Further, development of processes is simplified as each process need only have knowledge of how to issue a request, but not have knowledge of how to interface with the hardware peripheral device or perform the requested operation.

FIG. 1 is a first block diagram illustrating a multi-processor system (system) 100 in accordance with one embodiment of the present invention. As used within this specification, a "multi-processor system" can refer to a system that includes multiple processors. Each processor can be configured to execute program code. Each processor can be implemented as a single core processor, a multi-core processor, or as a core of a multi-core processor. System 100 can be implemented within a single IC or can be implemented using multiple ICs. Each processor can represent, or implement, one or more processes.

In one embodiment, system 100 can be implemented within a programmable IC. Programmable ICs are a well-known type of IC circuit that can be programmed to perform specified logic functions. Examples of programmable ICs can include, but are not limited to, field programmable gate arrays (FPGAs), complex programmable logic devices (CPLDs), and mask programmable devices. The phrase "programmable IC" refers to the ICs noted herein and ICs that are only partially programmable. For example, another type of programmable IC includes a combination of hard-coded transistor logic and a programmable switch fabric that programmably interconnects the hard-coded transistor logic.

Within a programmable IC, the processors can be implemented as hard processors, as soft processor cores implemented using the programmable circuitry of a programmable IC, or as both hard processor(s) and soft processor core(s). One non-limiting example of a soft processor can include the MicroBlaze™ processor available from Xilinx, Inc. of San Jose, Calif. (Xilinx). One or more embodiments disclosed within this specification, however, are not intended to be limited to programmable ICs, but rather can be implemented in the form of any of a variety of multi-processor systems that utilize a hardware peripheral device. The hardware peripheral device can be included within the same IC as the processors or within a different IC. For purposes of illustration, however, system 100 is described as being implemented within a single IC.

System 100 can include a processor 105, a processor 110, and a processor 115. As noted, each of processors 105-115 can be configured to execute program code. While three processors are used within this specification for purposes of illustration, only two more processors are needed to implement a multi-processor system that realizes the benefits of one or more embodiments disclosed herein. Like numbers will be used to refer to the same items throughout this specification.

As shown, processor 105 is coupled to peripheral device 135 via bus 120. Processor 110 is coupled to peripheral device 135 via bus 125. Processor 115 is coupled to peripheral device 135 via bus 130. Each of buses 120-130 can be implemented as any of a variety of known bus types capable of communicatively linking electronic devices. Examples of buses that can be used to implement buses 120-130 can include, but are not limited to, Local Memory Bus (LMB), Processor Local Bus (PLB), Interface-X, or the like. One or more or all of the aforementioned bus types, for example, can be implemented using commercially available intellectual property (IP) cores available from Xilinx.

Peripheral device 135 can be a hardware-implemented peripheral device. For example, peripheral device 135 can be custom circuitry that has been designed or optimized to perform a selected operation efficiently and/or quickly. As used within this specification, the term "operation" can refer to a set of one or more related computations or calculations. As noted, a hardware accelerator is one example of peripheral device 135. For instance, hardware accelerators are often used to perform Fast Fourier Transform (FFT) operations.

As shown, each of processors 105-115 can be configured to issue a request to peripheral device 135 over buses 120-130 respectively. Thus, in one embodiment, a request can be a message issued from one of processors 105-115 to peripheral device 135. When peripheral device 135 is not busy servicing a request, peripheral device 135 can be accessed by a requesting processor, e.g., processor 105. In one embodiment, responsive to a request from processor 105, a driver can be provided to processor 105. The driver, when executed by processor 105, provides the instructions needed for processor 105 to interface with peripheral device 135 to effectively "offload" an operation to peripheral device 135 and to receive any result of the operation from peripheral device 135. For example, the driver causes processor 105 to provide information needed to perform an operation to peripheral device 135 and causes the processor to retrieve the result from peripheral device 135. Prior to receipt of the driver, processor 105 need not have any knowledge of how to interface with peripheral device 135 except for issuing the request.

When peripheral device 135 is busy servicing a prior request, e.g., a request from processor 110, peripheral device 135 is unable to service the request from processor 105. Accordingly, in one embodiment, processor 105 can be provided with a program that, when executed by processor 105, allows processor 105 to perform the operation that was initially intended to be offloaded to peripheral device 135. By providing either a driver that allows a processor to interface with peripheral device 135 or a program that allows a processor to perform the requested operation, bottlenecks resulting from processors waiting for peripheral device 135 to become available can be alleviated. As was the case with the driver, prior to receipt of the program by processor 105, processor 105 need not have any knowledge of how to perform the operation.

Peripheral device 135 can be configured to continually update a status of peripheral device 135 as free or busy. Based upon the status, which can be updated as peripheral device 135 continues to service requests received from processors 105-115, the relevant processor is provided with the program or the driver. Thus, each processor need only be configured to issue a request to peripheral device 135, thereby simplifying development of each respective processor 105-115. Responsive to issuing the request via one of buses 120-125, the determination as to whether the requesting processor receives the program or the driver is made by peripheral device 135, is performed according to the status of peripheral device 135, and is not contingent upon any further action by the requesting processor. In one embodiment, for example, peripheral device 135 can supply either the driver or the program. In another embodiment, another device in communication with peripheral device 135, e.g., that is aware of the status of peripheral device 135, can supply the driver or the program to the requesting processor.

Figure 2:
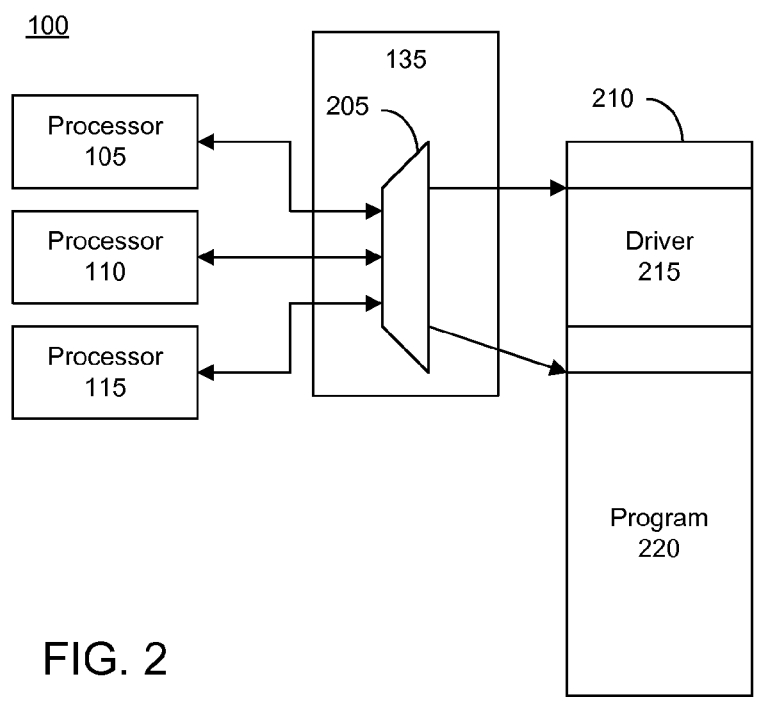
FIG. 2 is a second block diagram illustrating the system of FIG. 1 in accordance with another embodiment of the present invention.

FIG. 2 is a second block diagram illustrating system 100 of FIG. 1 in accordance with another embodiment of the present invention. FIG. 2 illustrates further detail relating to arbitrating among requests within a multi-processor system. FIG. 2 illustrates an embodiment in which each of processors 105-115 is coupled to an arbiter 205. In the embodiment illustrated in FIG. 2, arbiter 205 is included as part of peripheral device 135, though the embodiments are not limited in this regard and arbiter 205 can be external to peripheral device 135. For ease of illustration, the buses to which processors 105-115 are coupled are not illustrated. Each of processors 105-115, however, is coupled to arbiter 205, and thus, peripheral device 135, via one or more buses.

In one embodiment, arbiter 205 can be implemented in the form of a plurality of offset registers or "mappers." Arbiter 205 can be configured to map requests for access to peripheral device 135 from processors 105-115 to different memory locations or addresses within physical memory 210 corresponding to either a driver 215 or a program 220. As shown, physical memory 210 stores driver 215 and program 220 as discussed with reference to FIG. 1. Driver 215 is program code specifying instructions for interfacing with peripheral device 135. When executed, driver 215 allows a processor to interface with peripheral device 135 to offload an operation to peripheral device 135 and to receive a result from peripheral device 135. Program 220, when executed by a processor, allows the processor to perform the operation without the involvement of, e.g., the peripheral device 135.

In one embodiment, responsive to providing a processor with a starting address of driver 215, arbiter 205 can determine that peripheral device 135 is busy and change the status of peripheral device 135 to busy. Driver 215 can include program code that monitors the memory address being executed by a processor. The program code can cause the processor executing driver 215 to notify arbiter 205 when a selected address within physical memory 210 is executed as determined through observation of the value stored in the program counter of that processor.

For example, the selected address can be a return address of driver 215. Execution of the return address signifies the end or completion of execution of driver 215 and, thus, the processing of an operation. When the processor executing driver 215 reaches the selected address, the processor can notify arbiter 205 that the selected memory address has been reached. Responsive to receiving the notification that the selected address has been executed, arbiter 205 can determine that peripheral device 135 has completed servicing a request and change the status of peripheral device 135 to free. For example, arbiter 205 can determine that peripheral device 135 is free responsive to the processor that is executing driver 215 encountering the return address within driver 215.

In another embodiment, additional circuitry can be included that allows arbiter 205 to monitor the value stored in the program counter of each of processors 105-115. Responsive to providing a processor, e.g., processor 105, with a starting address of driver 215, arbiter 205 can determine that peripheral device 135 is busy and change the status of peripheral device 135 to busy. Arbiter 205 can identify the processor to which the starting address of driver 215 is provided and monitor the value stored in the program counter of that processor, e.g., processor 105, for the occurrence of a value corresponding to, or matching, the selected address. Accordingly, responsive to processor 105 reaching the selected address of driver 215, as indicated by the value of the program counter of processor 105, arbiter 205 can determine that peripheral device 135 has completed servicing the request from processor 105 and change the status of peripheral device 135 from busy to free.

Thus, each of processors 105-115 can be configured to access, e.g., issue a request, to an address corresponding to peripheral device 135. Peripheral device 135 can respond to requests with either the starting address of driver 215 or the starting address of program 220 based upon the status of peripheral device 135 being busy or free.

Some processors are configured to communicate both instructions and data over a same bus. For such a processor, a peripheral device that is accessible to the processor can be coupled to the same bus to which the processor is coupled. Being coupled to the same bus allows the processor to send information such as data to the peripheral device for processing. The peripheral device, upon completion of the requested operation, sends result data back to the requesting processor. The processor further can receive instructions, whether for driver 215 or program 220, over the bus. Thus, in one aspect, peripheral device 135 can be coupled to each of processors 105-115 via such a bus.

Other processors, however, are configured to utilize two different buses. Such processors use an instruction bus over which executable instructions are transported or received by the processors and a data bus that is reserved for transporting data. In an embodiment in which the processors utilize both instruction and data buses, peripheral device 135 can be coupled to each of processors 105-115 via a data bus and an instruction bus. For example, requests directed to peripheral device 135 can be received via the instruction bus. Instructions and/or pointers to instructions, e.g., addresses, from peripheral device 135 can be sent to the requesting processor via the instruction bus. Data provided to or received from peripheral device 135 can be transported via the separate data bus.

Figure 3:
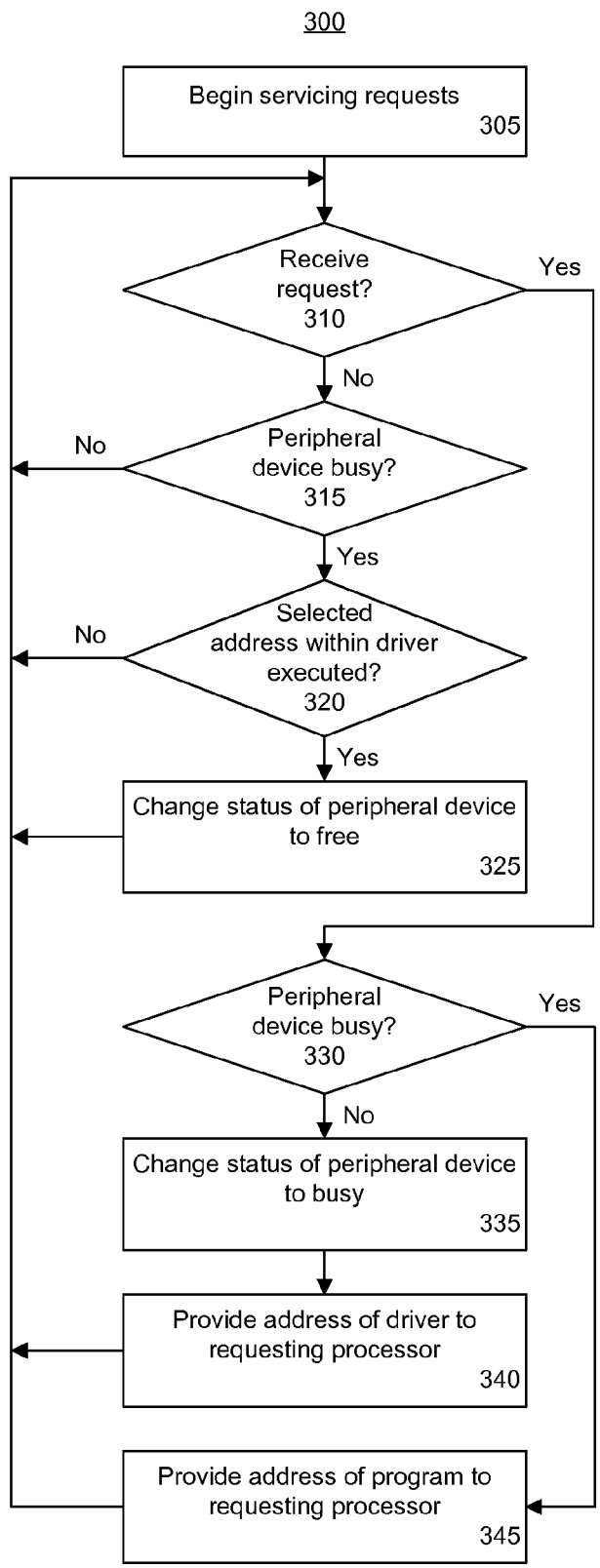
FIG. 3 is a flow chart illustrating a method of servicing requests within a multi-processor system in accordance with another embodiment of the present invention.

FIG. 3 is a flow chart illustrating a method 300 of servicing requests within a multi-processor system in accordance with another embodiment of the present invention. Method 300 can be implemented using a system as illustrated with respect to FIGS. 1 and 2. Accordingly, method 300 can begin in step 305, where the arbiter begins monitoring for requests directed to the peripheral device from the processors. In step 310, the arbiter can determine whether a request has been received. If so, method 300 can continue to step 330. If not, method 300 can continue to step 315.

In step 315, the arbiter can determine whether the peripheral device is busy. In one embodiment, the arbiter can consult a flag or register that, if set, indicates that the peripheral device is busy servicing a request. For example, the flag can be set responsive to the arbiter providing the address of the driver to a requesting processor. Responsive to determining that the requesting processor is executing a selected address of the driver, e.g., the return address, the arbiter can clear the flag indicating that the peripheral device is now free. In this example, the arbiter need only track whether a processor, if any, is executing the driver and whether that processor, once provided with the starting address of the driver, executes the selected address within the driver.

Accordingly, if the peripheral device is busy, method 300 can continue to step 320. If not, method 300 can loop back to step 310 to continue monitoring for requests from the processors. Continuing with step 320, when the arbiter determines that the peripheral device is busy, the arbiter can determine whether the selected address within the driver has been executed by the processor executing the driver. If so, method 300 can proceed to step 325. If not, method 300 can loop back to step 310 to continue monitoring for requests for service. Proceeding with step 325, responsive to determining that the processor executing the driver executed the selected address, the arbiter can change the status of the peripheral device to free. After step 325, method 300 can loop back to step 310 to continue monitoring for requests.

In step 330, where the arbiter has received a request as determined in step 310, the arbiter can determine whether the peripheral device is busy. If so, method 300 can continue to step 345. If not, method 300 can proceed to step 335. Proceeding with step 335, when the arbiter determines that the peripheral device is not busy, the arbiter can change the status of the peripheral device to busy, e.g., by changing the state of the flag. In step 340, the arbiter can provide the requesting processor with the starting address of the driver.

In step 345, when the arbiter has determined that the peripheral device is busy, the arbiter can provide the starting address of the program to the requesting processor. Accordingly, the requesting processor can execute the program to perform the operation that the processor had attempted to offload to the peripheral device. This allows the peripheral device to continue serving a request, e.g., perform a first operation, while the requesting processor concurrently performs a second operation in parallel, thereby avoiding any bottlenecks.

Figure 4:
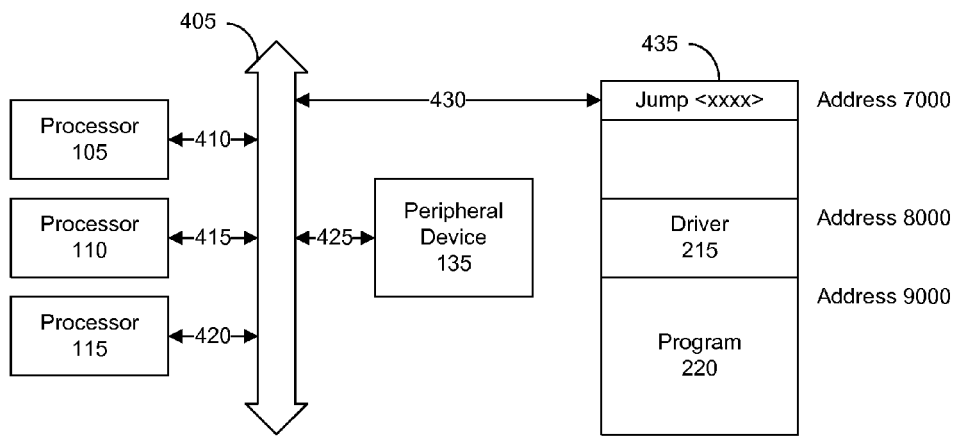
FIG. 4 is a third block diagram illustrating a system for processing requests for service within a multi-processor system in accordance with another embodiment of the present invention.

FIG. 4 is a third block diagram illustrating a system 400 for processing requests within a multi-processor system in accordance with another embodiment of the present invention. FIG. 4 illustrates an embodiment in which each of processors 105-115 is coupled to peripheral device 135 via a single bus 405. It should be appreciated that in cases where processors 105-115 utilize both data and instruction buses, bus 405 can represent one or more of the data bus and instruction bus. Each of processors 105-115 can couple to bus 405 via bus interconnect circuitry 410, 415, and 420 respectively. Peripheral device 135 couples to bus 405 via bus interconnect circuitry 425.

System 400 illustrates a technique based upon indirection to direct processors to different portions of memory depending upon the status of peripheral device 135 when a request is received. As shown, system 400 further illustrates a physical memory 435 that is coupled to bus 405 via bus interconnect circuitry 430. In one embodiment, each of processors 105-115 can be configured to access a predetermined memory address, which is 7000 in this example, when access to peripheral device 135 is desired. For example, processors 105-115 can be configured to access a particular module when access to peripheral device 135 is desired. The module can comprise a jump instruction with an operand specifying either the starting address of driver 215 or the starting address of program 220.

Peripheral device 135 can utilize a same or similar technique as described with reference to FIGS. 1-3 to maintain or determine the status of peripheral device 135 as being busy or free. For example, a similar technique of monitoring for whether a processor has been directed to a starting address of driver 215 or a starting address of program 220, and whether that processor has executed a selected address of driver 215 can be used.

At the predetermined address 7000, a jump command can be stored. In the embodiment illustrated in FIG. 4, peripheral device 135 can be configured to dynamically update the jump command, or at least the operand of the jump command indicating the particular address to which the requesting processor should jump, that is stored at the predetermined address. Peripheral device 135 updates the operand during runtime, e.g., dynamically, to indicate either the starting address of driver 215 or the starting address of program 220 according to the status of peripheral device 135 being busy or free over time as requests are received and serviced.

For example, consider the case where driver 215 has a starting address of 8000 and program 220 has a starting address of 9000. Peripheral device 135 can update the operand of the jump instruction at address 7000 so that the instruction at address 7000 is "Jump 8000" when peripheral device 135 is free. Thus, the requesting processor is directed to, e.g., provided with, driver 215, which can be executed by the requesting processor to interface with peripheral device 135. When peripheral device 135 is busy, however, or responsive to becoming busy, e.g., accepting a request from one of processors 105-115, peripheral device can update the operand of the jump instruction at address 7000 so that the instruction at address 7000 is "Jump 9000." Thus, the requesting processor is directed to, or provided with, the address for program 220. Accordingly, the requesting processor executes program 220 and performs the operation itself.

It should be appreciated that with regard to FIG. 4, while each processor is described as "requesting" service from the peripheral device, the requesting processor need do no more than seek access to the peripheral device by reading or executing the instruction at the predetermined address 7000. The requesting processor need not issue a request (message) or otherwise determine any status of the peripheral device since the processor, through the technique described, is automatically directed to driver 215 or program 220. Thus, at least for purposes of the embodiment illustrated in FIG. 4, the requesting processor need not be a processor that issues a request, but rather can be any processor that executes address 7000, for example, when access to a peripheral device or peripheral device functionality is desired.

Figure 5:
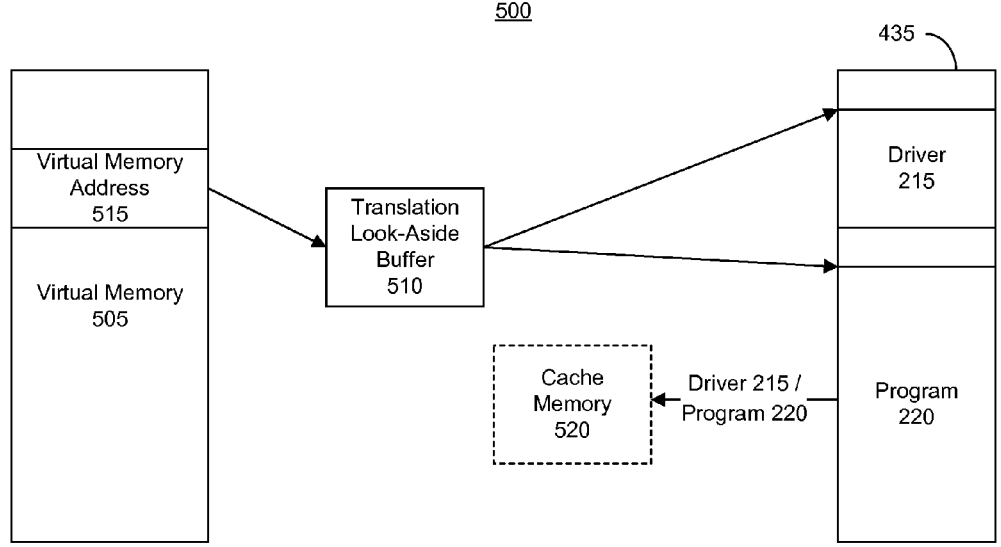
FIG. 5 is a fourth block diagram illustrating a system for processing requests for service within a multi-processor system in accordance with another embodiment of the present invention.

FIG. 5 is a fourth block diagram illustrating a system 500 for processing requests within a multi-processor system in accordance with another embodiment of the present invention. System 500 illustrates a technique for processing requests that relies upon a virtual overlay implemented using virtual memory 505 and a translation look-aside buffer (TLB) 510. Within the embodiment illustrated in FIG. 5, each of the processors (not shown) that are able to access peripheral device 135 (also not shown), can be configured to access a particular address of virtual memory illustrated as virtual memory address 515.

The entry within the translation look-aside buffer that maps virtual memory address 515 to an address of physical memory 435 can be updated based upon the state of the peripheral device, e.g., whether free or busy. Thus, the entry of TLB 510 that maps virtual memory address 515 to an address in physical memory 435 can be updated to map virtual memory address 515 to either the starting address of driver 215 or the starting address of program 220 according to whether the peripheral device is busy or free.

For example, the peripheral device can update the entry in TLB 510 to map virtual memory address 515 to the starting address of driver 215 when peripheral device 135 is free. Thus, the requesting processor is directed to, e.g., provided with, driver 215, which can be executed by the requesting processor to interface with the peripheral device. When the peripheral device is busy, however, or responsive to becoming busy, the peripheral device can update the entry within TLB 510 to map virtual memory address 515 to the starting address of program 220. Accordingly, the requesting processor is directed to, or provided with, the address for program 220. The requesting processor then executes program 220 and performs the operation itself.

In one embodiment, TLB 510 can be a single entity that is coupled to the memory bus of the system that translates memory locations as may be required for each processor. In another embodiment, each processor can include a TLB that can be updated per the current status of the peripheral device. For example, the peripheral device can issue a message to each processor or interface circuitry of the processors that causes the entry within the TLB of each respective processor to be updated as described.

System 500 also can include an optional cache memory 520. The optional nature of cache memory 520 is illustrated through the use of dashed lines. In an embodiment in which cache memory 520 is included, cache memory 520 can be continually and dynamically loaded with program code based upon the current status of the peripheral device. For example, responsive to the status of the peripheral device indicating free and/or to updating TLB 510 to map virtual memory address 515 to the starting address of driver 215, cache memory 520 can be loaded automatically with driver 215. Similarly, responsive to the status of the peripheral device indicating busy and/or updating TLB 510 to map virtual memory address 515 to the starting address of program 220, cache memory 520 can be loaded automatically with program 220.

The embodiment illustrated with cache memory 520 can be realized in cases where the processors are configured with a cache memory such as cache memory 520. In one aspect, the gains achieved via system 500 can be observed more readily when the processor includes a cache memory and a TLB with the cache memory being located after the TLB so that the cache memory can be loaded according to the entry within the TLB, and thus, the status of the peripheral device. Using cache memory 520 allows the program code that is to be made available to the requesting processor to be pre-loaded into the cache memory of that processor.

The flowchart in the figures illustrates the architecture, functionality, and operation of possible implementations of systems, methods, and computer program products according to one or more embodiments of the present invention. In this regard, each block in the flowchart may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and executable instructions.

One or more embodiments of the present invention can be realized in hardware or a combination of hardware and software. The one or more embodiments can be realized in a centralized fashion in one system or in a distributed fashion where different elements are spread across several interconnected systems. Any kind of data processing system or other apparatus adapted for carrying out the methods described herein is suited.

One or more embodiments of the present invention further can be embedded in a device such as a computer program product, which comprises all the features enabling the implementation of the methods described herein. The device can include a data storage medium, e.g., a computer-usable or computer-readable medium, storing program code that, when loaded and executed in a system comprising memory and a processor, causes the system to perform the functions described herein. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The one or more embodiments disclosed herein can be embodied in other forms without departing from the spirit or essential attributes thereof. Accordingly, reference should be made to the following claims, rather than to the foregoing specification, as indicating the scope of the one or more embodiments of the present invention.

What is claimed is:

1. A method of accessing a peripheral device, comprising:
determining whether the peripheral device is busy; and
selectively providing to a processor, according to whether the peripheral device is busy, either a driver that, when executed by the processor, causes the processor to offload the operation to the peripheral device, or a program that, when executed by the processor, causes the processor to perform the operation in lieu of the peripheral device performing the operation.

2. The method of claim 1, further comprising:
when the peripheral device is busy, selecting the program.

3. The method of claim 2, further comprising:
providing the program to the processor, wherein the processor, executes the program to perform the operation in lieu of the peripheral device performing the operation.

4. The method of claim 1, further comprising:
when the peripheral device is not busy, selecting the driver.

5. The method of claim 4, further comprising:
providing the driver to the processor, wherein the processor, in consequence of executing the driver, offloads the operation to the peripheral device.

6. The method of claim 1, further comprising:
receiving a request from the processor within an arbiter;
the arbiter determining whether the peripheral device is busy; and
the arbiter providing a starting address of the driver or a starting address of the program to the processor according to whether the peripheral device is busy.

7. The method of claim 1, further comprising:
the peripheral device updating an operand of a jump command located at a memory address associated with the peripheral device, wherein the operand indicates a starting address of the driver or a starting address of the program according to whether the peripheral device is busy.

8. The method of claim 1, further comprising:
the peripheral device updating an entry in a translation look-aside buffer of at least one processor with a reference to a starting address of the driver or a starting address of the program according to whether the peripheral device is busy.

9. The method of claim 8, further comprising:
loading at least one of the driver or the program into a cache memory associated with the translation look-aside buffer according to whether the peripheral device is busy.

10. The method of claim 1, further comprising:
determining whether the peripheral device is busy according to whether a selected processor is executing the driver and whether a selected address of the driver is executed by the selected processor.

11. A system comprising:
a peripheral device having a status indicating busy or available; and
a memory configured to store a driver that, when executed by a processor, causes the processor to offload a selected operation to the peripheral device, and a program that, when executed by the processor, causes the processor to perform the selected operation; and
wherein the peripheral device is configured to selectively provide the driver or the program to a processor when the processor seeks access to the peripheral device according to whether the status of the peripheral device is busy or free.

12. The system of claim 11, wherein the peripheral device is further configured provide a starting address of the driver to the processor when the peripheral device is free.

13. The system of claim 11, wherein the peripheral device is further configured to provide a starting address of the program to the processor when the peripheral device is busy.

14. A system comprising:
a peripheral device;
a memory configured to store a driver that, when executed by a processor, causes the processor to offload a selected operation to the peripheral device, and a program that, when executed by the processor, causes the processor to perform the selected operation; and
at least one translation look-aside buffer coupled to the peripheral device, wherein the at least one translation look-aside buffer is configured to store an entry referencing either the driver or the program,
wherein the peripheral device is configured to update the entry of the at least one translation look-aside buffer to reference the driver or the program in the memory according to whether the peripheral device is busy.

15. The system of claim 14, wherein the peripheral device is further configured to update the entry of the at least one translation look-aside buffer to reference the driver when the peripheral device is not busy.

16. The system of claim 15, wherein the peripheral device is further configured to update the entry responsive to completion of servicing of a request.

17. The system of claim 14, wherein the peripheral device is further configured to update the entry of the at least one translation look-aside buffer to reference the program when the peripheral device is busy.

18. The system of claim 17, wherein the peripheral device is further configured to update the entry responsive to accepting a request.

19. The system of claim 14, further comprising:
a cache memory that is independent of the memory, wherein at least a portion of at least one of the driver or the program is stored within the cache memory according to whether the peripheral device is busy.

20. The system of claim 14, wherein the translation look-aside buffer is configured to map a virtual memory address associated with the peripheral device to a physical memory address of the driver or a physical memory address of the program according to whether the peripheral device is busy.

* * * * *